July 30, 1963  E. G. FALLINGBORG ET AL  3,099,095
APPARATUS FOR USE IN TEACHING AND IN CARRYING
OUT PSYCHOTECHNICAL EXAMINATIONS
Filed April 17, 1961

INVENTORS
ERNST GUSTAV FALLINGBORG
and
WILLY JOHANNES ANDERSEN

BY Blum, Moscovitz,
Friedman and Blum
Attorneys

United States Patent Office 3,099,095
Patented July 30, 1963

3,099,095
APPARATUS FOR USE IN TEACHING AND IN CARRYING OUT PSYCHOTECHNICAL EXAMINATIONS
Ernst Gustav Fallingborg, The School of Malling, Malling, Denmark, and Willy Johannes Andersen, The School of Taagelund, Egtved, Denmark
Filed Apr. 17, 1961, Ser. No. 103,582
2 Claims. (Cl. 35—48)

This invention relates to an apparatus for use in teaching and in carrying out psychotechnical examinations.

In teaching and in carrying out psychotechnical examinations, it is known to use an apparatus comprising a frame and tablets designed to fill it, the tablets being marked to agree with a group of problems presented to the pupil or the person under investigation, in such a way that correct solution of the problems requires the tablets to be placed in definite positions in the frame, such apparatus being hereinafter referred to as apparatus of the kind specified.

When the pupil or the person under investigation has completed the problem, the teacher or the leader of the investigation examines the placing of the tablets to decide whether the problems have been correctly or incorrectly solved. The object of the present invention is to enable the teacher or leader of the investigation to determine in a short time whether a large number of pupils or persons under investigation have solved all the problems correctly, and to find out who has made mistakes and what mistakes have been made. As will be better explained in the following a further object of the invention is to enable the teacher to make his own sets of problems without altering the tablets.

According to the invention these objects are attained by using an apparatus comprising in combination a set of tablets each provided with a marking representing a question to the pupil and a hole to be used by the teacher, a frame of such form and dimensions, that it can embrace all the tablets in said set, when placed side by side into the frame, a first removable base plate adapted for being placed into and hereby filling out the said frame and provided with markings to be used by the pupil in placing the tablets in said frame in positions determined by the questions on each tablet, a second removable base plate intended for use by the teacher and also adapted for being placed into and hereby filling out the said frame and provided with markings, visible through the holes in said tablets placed in said frame.

In a preferred form the frame is formed as part of a box, provided with a hinged lid of similar dimensions.

A preferred form of apparatus according to the invention will now be described, by way of example, with reference to the accompanying drawing, wherein.

Figure 1:
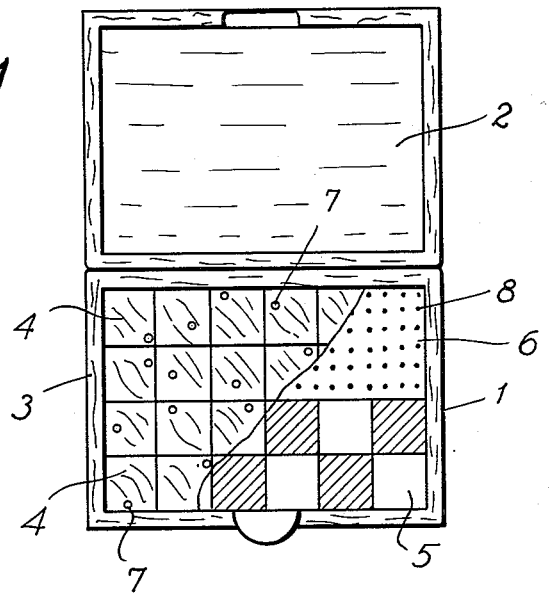
FIGURE 1 is a plan view of the apparatus in the open position.
Figure 2:
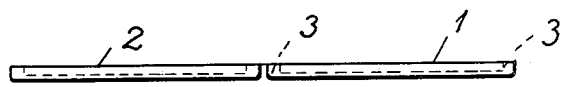
FIGURE 2 is a side elevation of the apparatus in the open position.

In the embodiment shown, the apparatus comprises a small flat box 1 having a lid 2 and being embraced by a frame 3. A set of tablets 4 can be arranged side-by-side to fill the frame 3. Two removable bases, one base 5 to be used by the pupil and the other base 6 to be used by the teacher, both being made for example of cardboard, may be fitted in the bottom of the box 1. In the drawing, halves of both these bases 5 and 6 are shown side-by-side for the sake of clarity, but in fact each of these bases is intended to fill the whole bottom of the box. The pupil-base 5 comprises regions of the same size as the tablets 4. In the embodiment shown, these regions are distinguished by two different colours, according to a set problem which can be answered in one of two ways. For example, 24 words may be presented to the pupil, namely one word on each tablet, and the problem resides in deciding whether these words are verbs or nouns, the pupil being intended to place the corresponding tablet on a light or dark region on the pupil-base 5 in the frame to agree with his answer for each individual word. In general, the pupil or the person under investigation is intended to decide, when placing each individual tablet in position, whether the latter is intended to be placed on one or other kind of region of the base 5, according to the wording of the problem.

Each of the tablets includes a hole 7. When the pupil or the person under investigation has placed all the tablets in position, the box is handed to the teacher or leader of the investigation, who closes the box, turns it over and brings the teacher-base 6 into the position of the pupil-base 5. He can also be satisfied with fitting the base 6 in the lid, and turning the tablets over into the latter.

The teacher-base 6 bears marks 8 which are so applied that one or other of them becomes visible through the holes 7 when the tablets are in position on the base 6. The marks 8 on the base 6 are so arranged that correct solution of the problems causes marks of the same kind, for example as shown a dot of a definite colour, to appear in all the holes 7 if all the problems have been correctly answered. Therefore the teacher at a glance can see, if all the problems have been solved correctly, and if not, which problems have been answered falsely. Also when handling a great number of pupils at a time, the teacher easily can examine all the answers received from all the pupils.

The apparatus may be used for problems which can be answered in more than two different ways, in which case the base-plates 5 and 6 must be devised according to the number of possible answers. For example, the questions which the pupil has to answer may embrace adjectives and adverbs in addition to verbs and nouns. In this case, there may be regions of four different colours on the pupil-base 5, and the marks 8 on the teacher-base 6 must be arranged to correspond to those positions which the holes 7 will accordingly assume when all the questions are correctly answered.

A great advantage of the present apparatus, which decisively distinguishes it from those formerly known, is that the holes on the tablets belonging to the appliance do not correspond to a pattern of any kind, which could be used by the pupil to act as a check in determining if they have been correctly placed or not, and thus making it possible for the pupil to place the tablets correctly without solving the problem at question.

The fact that the check is based entirely on the placing of the marks on a loose checking base enables the tablets, once they have been shaped out, to be split up into any desired number, and also leads to an almost unlimited number of possibilities of combining problems numbers which it is desired to put together in solution-groups, with the result that a teacher or leader of an investigation can adapt the apparatus to the investigations which he wishes to carry out simply by preparing his own checking bases without being bound to fixed codes.

We claim:
1. Teaching apparatus comprising a set of tablets of the same dimensions, a frame sized and shaped to receive said tablets completely interchangeably in rows and columns, a first removable base plate sized and adapted to be placed in said frame and carrying markings in rows and columns corresponding to the tablet rows and columns and sized for each tablet to be positioned over a respective marking when all of said tablets are in said frame, each of said tablets having a different tablet marking and said first base plate markings being differentiated so as to permit each tablet to be placed over a respective first base plate marking to answer correctly questions respec- tively corresponding to the respective tablets, each of said tablets having an arbitrarily located through hole of small diameter relative to the size of the tablet, the location of said holes varying for different tablets, and a second removable base plate sized and adapted to be placed in said frame and carrying at least one set of identical dots in rows and columns corresponding to the tablet rows and columns, each tablet being over a respective dot when said second base plate and all of said tablets are in said frame, said dots and holes being of the same diameter, said dots being further positioned to be visible through said holes when tablets are placed in said frame in correct answers to said questions.

2. Teaching apparatus comprising a set of tablets of the same dimensions, a frame sized and shaped to receive said tablets completely interchangeably in rows and columns, a first removable base plate sized and adapted to be placed in said frame and carrying markings in rows and columns corresponding to the tablet rows and columns and sized for each tablet to be positioned over a respective marking when all of said tablets are in said frame, each of said tablets having a different tablet marking and said first base plate markings being differentiated so as to permit each tablet to be placed over a respective first base plate marking to answer correctly questions respectively corresponding to the respective tablets, each of said tablets having an arbitrarily located through hole of small diameter relative to the size of the tablet, the location of said holes varying for different tablets, and a second removable base plate sized and adapted to be placed in said frame and carrying sets of dots, each set being a different color and in rows and columns corresponding to the tablet rows and columns, each tablet being over a respective dot when said second base plate and all of said tablets are in said frame, said dots and holes being of the same diameter, each of said sets of dots being further positioned to be respectively visible through said holes when tablets are placed in said frame in correct answers to said questions.

References Cited in the file of this patent
UNITED STATES PATENTS

| | | |
|---|---|---|
| 1,539,909 | Paris | June 2, 1925 |
| 2,138,524 | Harkins | Nov. 29, 1938 |
| 2,782,038 | Engel | Feb. 19, 1957 |
| 2,954,616 | Mogard | Oct. 4, 1960 |